United States Patent
Boller et al.

(10) Patent No.: US 6,687,324 B1
(45) Date of Patent: Feb. 3, 2004

(54) COATED METAL ARTICLES

(76) Inventors: Ernest R. Boller, R.R. 6, Marion, IN (US) 46745; Lowell D. Eubank, 1102 Greenway Rd., Wilmington, DE (US) 19801

( * ) Notice: Subject to any disclaimer, the term of this patent is extended or adjusted under 35 U.S.C. 154(b) by 575 days.

(21) Appl. No.: 03/237,574

(22) Filed: Jul. 19, 1951

Related U.S. Application Data

(62) Division of application No. 02/645467, filed on Feb. 4, 1946.

(51) Int. Cl.$^7$ ................................................. G21C 3/20
(52) U.S. Cl. ...................... 376/416; 376/417; 376/457; 420/470; 420/473; 420/560; 427/6
(58) Field of Search ................................ 117/19, 51, 52, 117/71, 131; 376/457, 416, 417; 420/470, 473, 560; 427/5, 6

(56) References Cited

U.S. PATENT DOCUMENTS

| | | | | | |
|---|---|---|---|---|---|
| 2,059,557 | A | * | 11/1936 | Corson | 420/470 |
| 2,847,321 | A | * | 8/1958 | Eubank | 427/5 |
| 2,848,351 | A | * | 8/1958 | Boller et al. | 427/5 |
| 2,849,337 | A | * | 8/1958 | Robinson | 427/5 |
| 2,928,168 | A | * | 3/1960 | Gray | 376/417 |
| 2,994,951 | A | * | 8/1961 | Eubank et al. | 376/414 |
| 3,037,924 | A | * | 6/1962 | Creutz | 376/416 |

* cited by examiner

Primary Examiner—Harvey E. Behrend

(57) ABSTRACT

A metallic uranium article having a protective coating of a copper-tin alloy containing from 45 to 50% by weight of copper and from 55 to 50% by weight of tin, said alloy being firmly bonded to the metallic uranium.

12 Claims, 1 Drawing Sheet

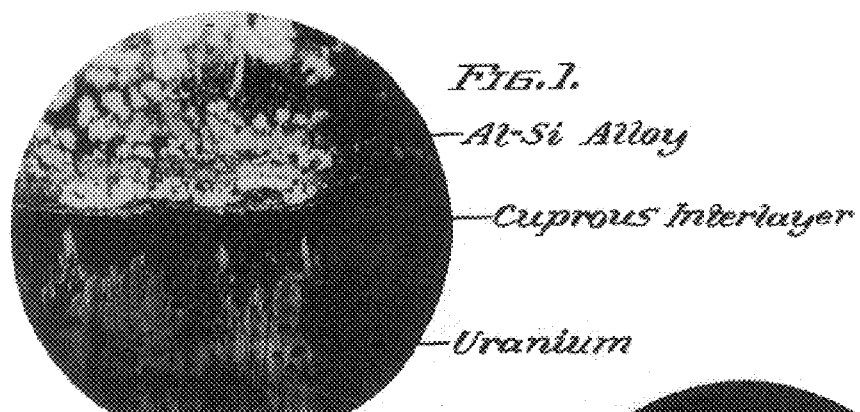
FIG. 1.
— Al-Si Alloy
— Cuprous Interlayer
— Uranium
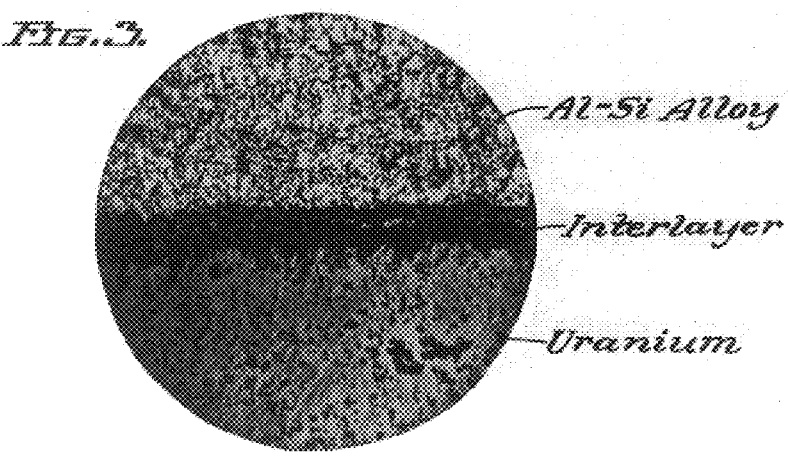
FIG. 2.
Al-Si Alloy —
Interlayer —
Uranium —
FIG. 3.
— Al-Si Alloy
— Interlayer
— Uranium

COATED METAL ARTICLES

This application is a division of our copending application Ser. No. 02/645,467, filed Feb. 4, 1946.

This invention relates to metallic protective coatings for uranium. It is particularly concerned with bronze coatings on uranium for protection of the uranium against corrosion and for use under other metal coatings.

Metallic uranium is highly reactive with oxidizing agents and its use in the presence of air or other oxidizing media requires its protection by some less reactive coating. The metallic uranium has a tendency to alloy with some coating metals, especially at ele-vated temperatures, and this tendency may lead to diffusion of uranium through the coating metal with consequent reduction in resistance or the coating to oxidizing agents.

In the accompanying drawings, FIGS. 1–3 are photomicro-graphs of cross-sectional views of uranium articles coated by the process of this invention.

The present invention has for its object the provision of coatings which are not only resistant to oxidizing agents and other corrosive media but are also resistant to the diffusion of uranium and consequently retain their protective value over long periods and under widely varying conditions of exposure.

In accordance with the present invention metallic uranium is provided with a protective coating of bronze. The coating preferably is applied by dipping the metallic article into molten bath of the coating metal.

The proportions of copper and tin in the coating may be varied over a wide range. In general it is desirable that the coating contain about 20–75% copper and about 80–25% tin by weight. Other metals may be present in minor proportions. Coating baths having the composition of speculum metal (67% copper, 33% tin) have been employed satisfactorily to provide continuous coatings of this metal. Bronze baths containing copper and tin corresponding to the peritectic mixture (47%, copper 53% tin) also have been employed and these baths have been found to be especially advantageous in the application of undercoatings for the application of certain other coating metals by the hot dip process. In the early application of bronze coatings to uranium, it was found that the addition of about 1% of aluminum or ½% to 5% of nickel was advantageous for improving the continuity of the resulting coatings. Later it was determined that, by employing uranium the surface of which has been properly prepared, no additions to the bronze baths are necessary to produce continuous, adherent coatings. A satisfactory preparatory treatment comprises immersing the uranium in 50% to 70% nitric acid at a temperature between 50° and 60° C. for between four and six minutes, rinsing the metal in clean, warm water, and drying immediately before dipping in the molten bronze bath.

The molten bronze bath may be employed with a dry surface but is preferably protected by an alkali-metal chloride flux, as described and claimed in U.S. patent application Ser. No. 583,176 filed Mar. 16, 1945 by Lowell D. Eubank.

The optimum temperature for bronze-dipping the metallic uranium depends upon the composition of the bronze being applied. Temperature from 700° to 850° C. have been employed with com-position varying from the peritectic mixture to speculum metal.

The bronze coatings may serve as temporary or permanent protective coatings in the application of coating metals such as zinc, tin, terne, aluminum-silicon alloys, and aluminum. Tin does not coat the speculum metal coatings readily and con-sequently when this metal is employed it is desirable to employ a bronze having a composition nearer that of the peritectic mixture or to follow the dip in speculum metal with a dip in a bronze bath containing a greater tin concentration before applying the pure tin coating. Two-dip coatings of copper-tin peritectic over speculum metal present a more workable surface than the speculum metal alone. Coatings prepared from bronze baths containing 57% copper and 43% tin by weight exhibit properties similar to the coatings applied by dipping first in speculum metal and then in the peritectic mixtures.

The bronze coatings of the invention have been found to be especially suitable as temporary protective undercoatings for the application of aluminum-silicon casting alloy coatings or brazings to uranium. Aluminum-silicon casting alloys are aluminum alloys of silicon in which the aluminum predominates. The principal alloys of this type are those containing 5% to 20% by weight of silicon and the remainder essentially aluminum. The ternary alloys of aluminum, silicon, and sodium with about 10–15% silicon and about 0.1% sodium are commonly preferred. All of these alloys tend to form with metallic uranium a layer of a brittle compound of aluminum, uranium, and silicon at the interface between the metal and the aluminum-silicon coating. This compound layer frequently exhibits cracks which increase in size with the thickness of the compound layer. A compound layer of substantial thickness is undesirable not only because of its characteristic brittleness but because the presence of cracks and fissures substantially impairs the protective value of the coating. By the application of a bronze undercoating prior to dipping metallic uranium in aluminum-silicon alloy, the formation of the brittle compound layer may be inhibited and its thickness held to a value such that the objectionable characteristics do not attain significant proportions.

Bronze undercoats beneath aluminum-silicon alloy coatings have a highly important value in substantially preventing undercutting by acidic water containing oxidizing agents and chloride ions. Thus an aluminum-silicon alloy coating may be completely penetrated and yet continue to afford adequate protection for the underlying metal. This property is characteristic even though the final product contains a copper film only 0.01 to 0.03 mil thick and considerably denuded of tin, beneath the aluminum-silicon alloy.

Aluminum-silicon alloys do not wet bronze coatings on uranium readily and dipping times as long as 30 seconds may be necessary to secure continuous coatings by this method. Such long coating periods may lead to washing off of the bronze and formation of substantial areas of thick, brittle compound layer. By subjecting the bronze-coated metal to a preliminary dip in molten tin, the time required for coating with molten aluminum-silicon alloys may be reduced to a fraction of that required for applying the aluminum-silicon coatings directly to the bronze-coated metal. Thus instead of a 30-second dipping period only a 1- to 5-second dip is necessary.

In certain applications the presence of tin in the outer aluminum-silicon coatings decreases the corrosion resistance of the coatings. For such applications it is desirable to remove excess tin by wiping or centrifuging the tin-coated article immediately after the tin dip so as to remove all excess molten metal, and to renew the aluminum-silicon bath whenever its tin content attains an undesirably high value. Centrifuging may be effected in a basket type or lathe type centrifuge supporting the article either concentrically or eccentrically and using speeds corresponding to force from 100 to 10,000 or more times the force of gravity.

Application of the tin coating at a high temperature, for example a temperature of at least 600° C. and preferably 630–640° C. also is instrumental in providing an exceedingly thin tin coating. This also is necessary for maintaining the uranium article in Beta phase in those cases in which reversion to the Alpha phase would be objectionable. Uranium passes from Alpha to Beta phase when heated above about 650° C. but re-version to Alpha phase during normal coating periods may be inhibited by maintaining temperatures above about 600° C.

By applying a bronze coating from a bath containing about 45–50% copper and about 50–55% tin at a temperature of about 730° C., a tin coating at about 600° C. with subsequent centrifuging in a 12-inch basket at about 640 rpm maximum speed for 5 seconds, and then an aluminum-silicon coating of about 88 parts aluminun and 12 parts silicon at 640° C. for 2 seconds, coatings are obtained which are free from objec-tionable compound layers and which contain copper and tin in amounts corresponding to bronze 0.03 to 0.1 mil thick between the uranium metal and the aluminum-silicon coatings. Longer dips in the aluminum-silicon alloy produce thinner bronze layers of reduced tin content and the preferred procedure in-volving a dipping period of about 6 seconds in aluminum-silicon provides a final product with a cuprous film only 0.01 to 0.03 mil thick of very low tin content.

The tin bath and the aluminum-silicon bath may be employed without top fluxes. A top flux on the aluminum-silicon bath has the disadvantage that, upon cooling, the flux crystals may mark the coating, and when an aluminum sheath is applied over the aluminum-silicon, some of the flux may be entrapped between the sheath and the base metal and thus prevent a continuous bond between the two. However by using a dividing partition at the surface of the alloy, it is possible to employ a flux on part of the aluminum-silicon in such a manner that the article dipped therein can be removed through a flux-free surface, thereby avoiding any adhesion of flux to the metal article. This arrangement can be used in conjunction with the flux on the bronze bath in such a manner as to eliminate an inter-mediate tin dip. Thus by providing a flux bridge (essentially a flux-filled channel) from the bronze bath to the aluminum-silicon bath so that the metal article may be maintained under flux throughout its passage from the bronze bath to the aluminum-silicon bath and can then be withdrawn at a flux-free surface of the aluminum-silicon bath, satisfactory coatings can be obtained. This method permits relatively rapid wetting of bronze coatings by the aluminum-silicon bath but wetting is not as rapid in this case as when an intermediate tin dip is employed.

In employing the bronze, tin, aluminum-silicon sequence, some uranium is dissolved in the bronze bath, some bronze is dissolved in the tin bath, and some tin is dissolved in the alumium-silicon bath. An alkali-metal chloride flux on the surface of the bronze bath has been found to maintain the uranium content of this metal bath at value below 0.07% by weight. For the removal of uranium from bronze baths which are free of flux a small quantity of aluminum may be added. This forms an alloy with the uranium which can he skimmed from the bath. The intro-duction of copper into the tin bath by solution of bronze from the coated metal can be offset by intermittently adding a small proportion of aluminum at 600–650° C., and after thoroughly mixing the added metal with the bath, cooling to 300–350° C. and skimming the resulting aluminum-copper compound from the surface of the bath. In this way the copper content may be reduced to 0.1% or less.

Aluminum-silicon coatings prepared in accordance with the invention are useful as corrosion-resistant coatings and also as brazes or solders for the application of aluminum protec-tive sheathing to the base metal.

In the application of aluminum-silicon coatings either for use as such or for use as brazing alloys, it is sometimes desirable to thoroughly degas the alloy bath by passing a mixture of 20% chlorine and 80% nitrogen, by volume, through the bath for a few minutes and then to modify it by the addi-tion of a small proportion, for example about 0.1%, of metallic sodium. Unless these expedients are employed the aluminum-silicon coating may exhibit gas pockets and a coarse grain which reduce its effectiveness both as a pro-tective coating and as a bonding medium. The coarse grain becomes more pronounced as the cooling period increases. The aluminum-silicon bath should be renewed often enough to prevent an excessive tin content.

Aluminum-silicon coatings of the type described have been employed for the protection of cylindrical uranium rods from about 1 inch to about 1½inch in diameter. For the complete protection of such rods, the ends may be capped by aluminum caps or ferrules which may be compressed over the ends of the rods by suitable dies. Preferably the ends of the rod are machined down the thickness of the cap so that with the cap in place a smooth exterior surface is provided. Circumferential ridges over which the ferrules can be compressed may be left at or near the ends to assist in holding the cap in place. The most advantageous moment for the application of the ferrules is after the certrifuging of the rod to remove excess tin. Before applying the ferrules, it is advisable to dip the ends of the rod into molten aluminum-silicon in order to secure the maxium degree of adherence. By immediately applying the caps or ferrules to the hot coated ends and then dipping the assembly in molten aluminum-silicon alloy, a firmly adherent bond between the rod and the ferrules is obtained. If desired, the ferrules may be designed to provide an insulating gas space at the ends of the rod and a spacer of steel, beryllium, or some other metal may be inserted to reinforce the cap. It is sometimes convenient to employ a very thick metal cap so as to improve the conductivity at the end of the rod.

Aluminum-silicon coatings may be built in thickness by placing the capped and coated rod on smooth steel or asbestos-cement rollers and pouring molten alloy into the trough formed between the rod and one of the rollers. Pure aluminum also may be applied over the aluminum-silicon in this matter.

The bronze, tin, aluminum-silicon sequence of coatings is especially advantageous for the bonding of aluminum sheaths or cans to uranium rods. The procedure can be carried out in the same manner as described previously up to the point of rolling the coating on rollers.

One satisfactory canning method involves placing an aluminum can in a steel supporting shell in a canning die mantained at a constant and uniform temperature between about 590° and 625° C., pouring a small quantity of molten aluminum-silicon alloy into the can and plunging the ura-nium rod, immediately upon withdrawal from the aluminum-silicon bath, into the can so as to force the molten aluminum-silicon in the can out through the space between the rod and walls of the can. The quantity of aluminum-silicon in the can should be adjusted appropriately for the diameter and length of the rod canned and the clearance between rod and can. For rods about 1.4 inch in diameter and about 8 inches in length with about 15 mils total clearance between rod and can, about 60 to 100 grams have been found to be very suitable. Most of the aluminum-silicon applied by the hot-dip is washed from the rod by the molten metal in the can. Hence by em-ploying an aluminum-silicon alloy of high purity in the can, a low tin content may be secured even though the alloy applied by hot dipping was relatively impure in this respect. It is not necessary to provide ferrules on the rods to protect the ends when they are to be protected by an aluminum can. It is usually preferred to employ an aluminum can having a thick bottom to facilitate radial heat flow at the end (during ulti-mate use of the product), and to insert a thick aluminum disc in the top of the can to serve a similar purpose and also form a closure for the can. This disc should be preheated in an inert medium to a temperature in the neighborhood of that employed for the canning operation. The excess aluminum-silicon in the can serves as a brazing alloy to braze the cap into the can. Preferably the canned rod is promptly quenched. Quenching may be effected either before or after removing the canned rod from the steel supporting shell. Prompt quench-ing limits the dissolving action of the aluminum-silicon alloy on the bronze coating and on the uranium, and in this way assists in preventing formation of the brittle compound layer pre-viously described. It also insures a fine-grained alloy.

The canning process described permits the complete assembly of a uranium rod in a can of 20 to 35 mil wall thickness in a total elapsed time of as little as 45 seconds. Operating in this manner the reaction of the base metal with the aluminum-silicon alloy is controlled to limit the thickness of the aluminum-uranium-silicon compound layer to less than 0.3 mils and this layer, to the extend it is formed, is free from detrimental cracks of fissures.

EXAMPLE 1

A series of cylindrical extruded uranium rods about 8 inches long and 1.360 inches in diameter, after cleaning by a nitric acid pickling treatment, washing and drying as pre-viously described, were subjected to the following canning procedure:

Each rod was immediately dipped through a ½inch depth of potassium-sodium lithium chloride flux of the composition 53% potassiwm chloride, 42% lithium chloride and 5% sodium chloride, by weight, into a molten bronze bath consisting of 53 parts of tin and 47 parts of copper, by weight, at a tem-perature of 720° C. for 45 seconds. Upon removal from the bronze bath each rod, which was uniformly coated with a bronze coating, was immersed in a bath of molten tin at 640° C. for 20 seconds. Immersion in the tin bath was effected by dropping the rod onto the high end of a sloping wire rack sunk in the tin bath, allowing the rod to roll to the lower end, and removing it by a pair of tongs from the molten metal where the surface had just been carefully scraped to remove all traces of flux. Upon removal from the tin bath the rod was centrifuged at 640 rpm, in a centrifuge supporting the rod at about 6 inches from the axis of rotation, for 5 seconds to remove excess tin and then immersed in a bath of 0.1% sodium-modified, degassed 13X aluminum-silicon alloy (Federal specification AN-QQ-A-366, Amendment 4 Al-13X) at 600° C. for 6 seconds.

While the rod was being coated in this manner a 2S aluminum can which had an inside diameter 15 mils greater than the rod and had been cleaned by washing the can first with trichlorethene, then with an aqueous 0.1% soap solution containing 0.1% sodium pyrophosphate at 80° C., and finally with aqueous 20% o-phosphoric acid solution for 5 minutes at 20° C. was heated in a chromium steel supporting sleeve to a temperature of 640° C. and 80 grams of 13X aluminum-silicon alloy and an aluminum plug ½inch thick, with a hole through its center, preheated to about 630° C. and about 640° C., respectivey, were added to the can just before the metallic uranium rod was withdrawn from the aluminum-silicon bath. The plug was used to space the rod from the end of the can and provide good heat conduct-ivity at this location. It was inserted on the molten 13X alloy in the can by means of a rod having a tapered end fitting the hole in the plug snugly and having a sleeve for forcing the plug off the end. The coated uranium rod was passed from the bath immediately into the can and a slightly tapered aluminum cap about 5/16 inch thick, which had been pre-heated to a temperature of about 600° C., was inserted into the molten aluminum-silicon alloy filling the open end of the can. The complete assembly was then immediately quenched by immersion in water and the canned rod was removed from its supporting sleeve. In this manner a firm uniform bond between the uranium rod and the protective metallic can was obtained. The total elapsed time from immersion of the uranium rods in the bronze bath to their immersion in the quench tank was about 80–90 seconds.

FIG. 1 is photomicrograph at 500 magnifications showing a section of the bond between one of the uranium rods of this series and its protective can.

EXAMPLE 2

Another series of uranium rods of the same size as employed in EXAMPLE 1 was canned under similar conditions with the following changes. After the rods were centrifuged to remove excess tin, they were dipped into a molten 1.0% sodium-modified, degassed aluminum-silicon alloy containing 88% aluminum and 12% silicon (before modifying) at 600°±5° C. for 6 seconds. They were then inserted in aluminum cans, containing 70 grams of 0.1% sodium-modified, degassed aluminum-silicon alloy of the same composition, maintained at 590° C. The cans were capped and quenched as in the preceding example.

EXAMPLE 3

A 1.360"×8" metallic uranium rod having its ends machined down to accommodate ferrules was coated as described in EXAMPLE 1. Upon removal of the coated rod from the alum-inum-silicon bath it was immediately capped by aluminum caps pressed over the machine ends, redipped in the aluminum-silicon bath for b 2seconds, then placed in the valley formed by a pair of smooth "Transite" (asbestos cement) rollers rotating at about 200 ft. per minute peripheral velocity. Sixty-five grams of the modified degassed 88/12 aluminum silicon alloy at a temperature of 640° C. was poured into the trough formed between the uranium rod and one of the "Transite" rollers. When all of the aluminum-silicon had solidified, the rod was removed from the rollers and quenched by immersing it in water. It was then machined down to a 1.42 inch diameter to provide a smooth, even 30-mil coating.

EXAMPLE 4

A small metallic uranium rod, prepared for coating by pickling in nitric acid solution as previously described, was immersed for 45 seconds in a speculum metal bath (67% copper and 33% tin) at 810° C. During this period the bath cooled to 795° C. The rod was withdrawn from the bath and immersed in a eutectic bronze bath (47% copper and 35% tin) for about 1 minute at 710° C. It was withdrawn from this bath and centrifuged for 8 seconds at about 640 rpm. It was then quenched by immersion in water. The bronze coated rod was dried and than dipped for 30 seconds in an aluminum-silicon bath comprising 88 parts of aluminum and 12 parts silicon at a temperature of 593° C. The coated rod was rolled until the coating solidified, then washed with water. A firm over coating was obtained. A cross-section of the coated rod, showing the bond between the rod and the coating is illustrated in the photomicrograph, FIG. 2 of the drawing, at 100 magni-fications.

EXAMPLE 5

A metallic uranium rod prepared for coating as previously described was immersed for 40 seconds in a bronze bath con-sisting of 47 parts of copper and 53 parts of tin at 730° C. During the period of immersion the bath cooled from 730° C. to 720° C. The coated rod was then immersed in a tin bath at 420° C. for 10 seconds. The tin bath was covered with a 53% KCl, 42% LiCl, 5% NaCl flux. Upon withdrawal from the tin bath the rod was centrifuged for 5 seconds at about 640 rpm. It was then dipped quickly into an aluminum-silicon alloy bath containing 88% aluminum and 12% silicon and quickly withdrawn. The rod was dipped seven times in this bath, which was held at a temperature of 615° C. After the seventh dip it was withdrawn and laid on "Transite" rollers and 35 grams of additional aluminum-silicon alloy of the same composition was poured into the trough between the rod and the roller.

The rod was rotated for 10 seconds until the aluminum-silicon had solidified and was then quenched by immersion in water. FIG. 3 of the drawing is a photomicrograph of a cross-section of the coated rod at 100 magnification.

EXAMPLE 6

A small uranium rod, after pickling in nitric acid, washing and drying, as previously described, was immersed in a speculum metal bath at 850° C. for 1½ minutes during which the bath cooled to 840° C. The rod, upon withdrawal from this bath, was immersed in peritectic bronze at 700° C. for ½ minute, centrifuged for 15 seconds at 640 rpm, then quenched in water. The rod was coated with a continuous uniform protective bronze coating. Rods coated in this manner are afforded a substantial degree of corrosion resis-tance by the bronze coating.

EXAMPLE 7

A bronze-coated rod prepared as described in EXAMPLE 6 was dipped in 88/12 almuminum-silicon alloy at 595–600° C. for 30 seconds. Upon withdrawal from the aluminum-silicon alloy bath it was rotated at about 200 ft. per minute on "Transite" rollers for 15 seconds then quenched in water. The rod was coated with an aluminum-silicon coating over bronze.

EXAMPLE 8

An extruded uranium rod was pickled for one minute in 50% HNO₃ at room temperature, washed, dried and then dipped through a top flux of 50% NaCl and 50% KCl into a bronze bath containing 65% copper, 33% tin, and 2% nickel. After immersion in this alloy for 60 seconds, the rod was removed, dipped in a 50% LiCl, 40% KCl, 10% NaCl bath at about 550° C. for about ½ minute then cooled. The rod was completely coated with a continuous corrosion-resistant bronze coating.

EXAMPLE 9

An extruded uranium rod was dipped through a flux contain-ing 66% CaCl₂, 29% NaCl, and 5% KCl into a molten bronze con-sisting of 53% copper and 47% tin to which 5% of nickel (based on the weight of the bronze) had been added. The bath was at 840° C. After three minutes in the bath the rod was withdrawn, cooled and cleaned anodi-cally in 98% H₂SO₄ solution. A polished protective bronze coating was thus obtained on the metal.

EXAMPLE 10

A metallic uranium rod 1.1 inches in diameter and 4 inches long was first dipped through a chloride flux contain-ing 53% potassium chloride, 42% lithium chloride, and 5% sodium chloride, into a 47% copper 53% tin bath at a tempera-ture between 740° and 760° C. for 20 seconds. Upon withdrawal from the bronze bath the rod was centri-fuged for 5 seconds to remove excess metal, it was then immersed in a salt bath having the same composition as the flux on the bronze bath and main-tained at 605° C. After 20 seconds in this salt bath the rod was withdrawn and immersed in an unmodified 88% aluminum 12% silicon bath at 635° C. for 20 seconds. The rod was then placed on "Transite" rollers and rolled slowly while 22 grams of the aluminum-silicon alloy was poured into the trough be-tween one of the rollers and the rod. Thirty-two grams of 88/12 aluminum-siliccn alloy modified by the addition of 1% of zinc and 0.02% of sodium was then poured on and the roll-ing was continued until the coating had solidified. The rod was then quenched by immersion in water. When cool the coat-ing was machined to a uniform 30 mil thickness. The resulting coating formed a protection for tle metal, which was resistant to the corrosive action of hot aqueous hydrogen peroxide solution.

It will be understood that we intend to include variations and modification of the invention and that the preceding examples are illustrations only and in no wise to be con-strued as limitations upon the invention, the scope of which is defineed in the appended claims, wherein

We claim:

1. A metallic uranium article having a protective coating of a copper-tin alloy containing from 45 to 50% by weight of copper and from 55 to 50% by weight of tin, said alloy being firmly bonded to the metallic uranium.

2. A metallic uranium article having a protective coating consisting of aluminum separated from the uranium by an interlayer of an alloy containing copper and tin a weight ratio of from 20 to 75 of copper to form 80 to 25 of tin.

3. A metallic uranium article having a protective coating comprising a layer of substantially pure aluminum bonded to the uranium by a layer of lower melting aluminum-silicon alloy containing from 10 to 15% by weight of silicon and from 90 to 85% of aluminum, said latter alloy being sepa-rated from the uranium by a substantially thinner layer or copper alloy containing about 33% of tin.

4. A metallic uranium article having a protective coating of a ternary alloy containing from 0.5 to 5% nickel and copper and tin in a weight ratio of from 20 to 75 of copper to from 80 to 25 of tin.

5. A uranium article coated with an alloy consisting sub-stantially of 67% by weight of copper and 33% by weight of tin.

6. A uranium article coated with an alloy consisting sub-stantially of 47% by weight of copper and 53% by weight of tin.

7. A uranium article coated with an alloy consisting sub-stantially of 57% by weight of copper and 43% by weight of tin.

8. A uranium article coated with an aluminum-base metal and a layer of a copper-tin alloy containing copper and tin in a weight ratio of from 20 to 75 of copper to from 80 to 25 of tin therebetween.

9. The article of claim 8, in which the aluminum-base metal is an aluminum-silicon alloy containing from 5 to 20% of silicon and from 95 to 80% of aluminum.

10. The article of claim 9 wherein the aluminum-base metal is ternary and contains from 10% to 15% silicon from 89.9 to 84.9% aluminum and about 0.1% sodium.

11. The article of claim 10 wherein the silicon content is 12% by weight.

12. A metallic uranium article having a protective coating of a ternary alloy containing approximately 1% of aluminum and copper and tin in a weight ratio of from 20 to 75 copper to from 80 to 25 tin.

* * * * *